March 26, 1957     C. A. TALLAKSON     2,786,366
VARIABLE TORQUE DISTRIBUTING DIFFERENTIAL GEARING
Filed Feb. 14, 1956     4 Sheets-Sheet 1
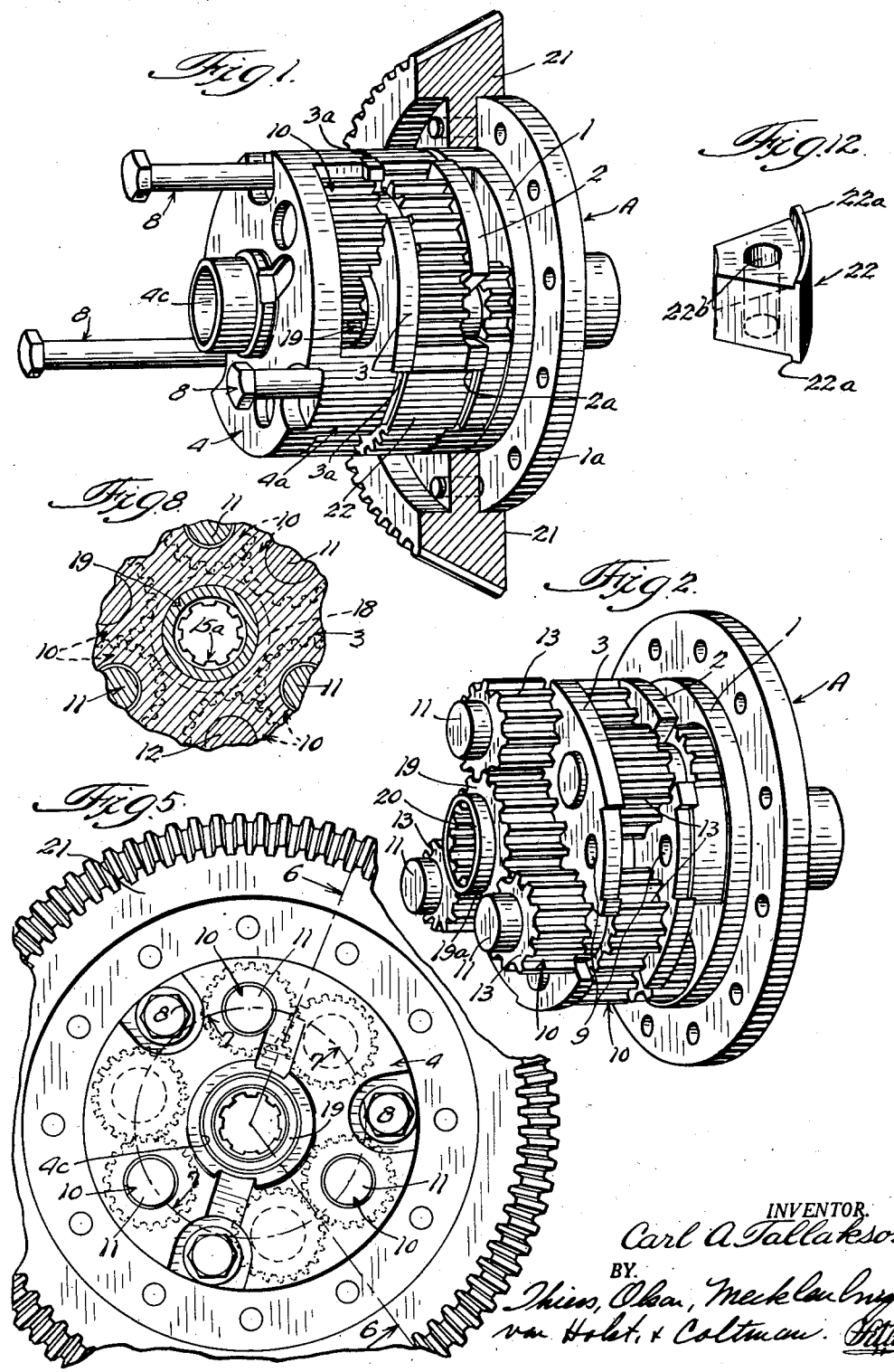
INVENTOR.
Carl A. Tallakson

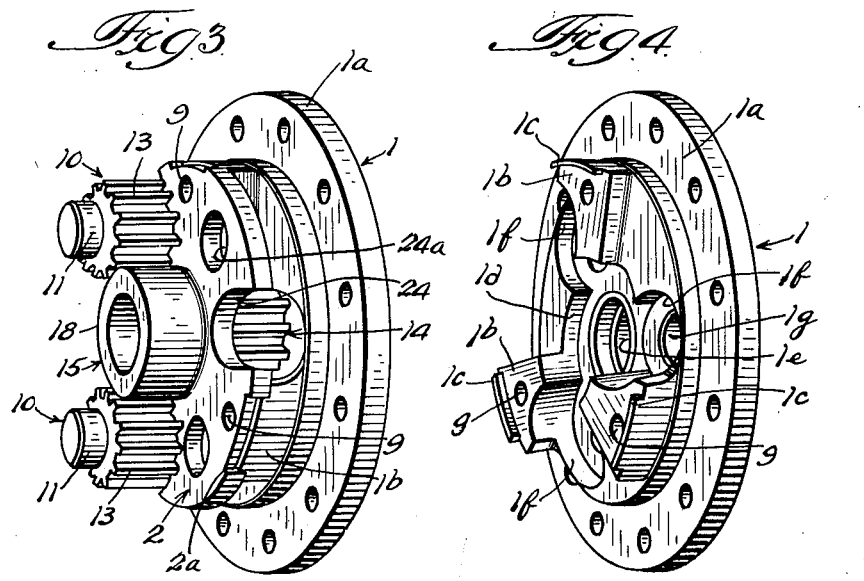
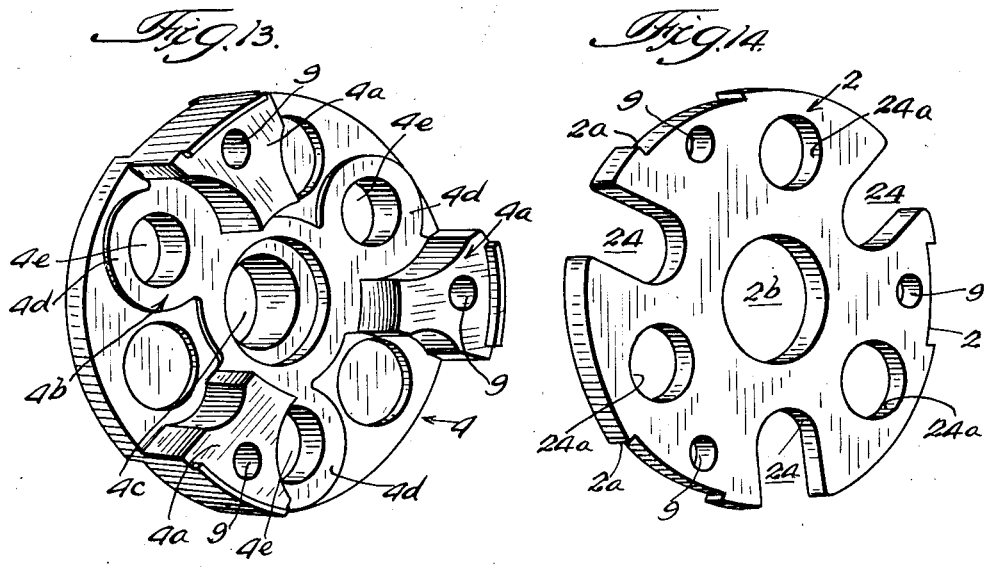

March 26, 1957 C. A. TALLAKSON 2,786,366
VARIABLE TORQUE DISTRIBUTING DIFFERENTIAL GEARING
Filed Feb. 14, 1956 4 Sheets-Sheet 3

INVENTOR.
Carl A. Tallakson
BY
Thiess, Olsen, Mecklenburger,
van Holst, & Coltman. Attys.

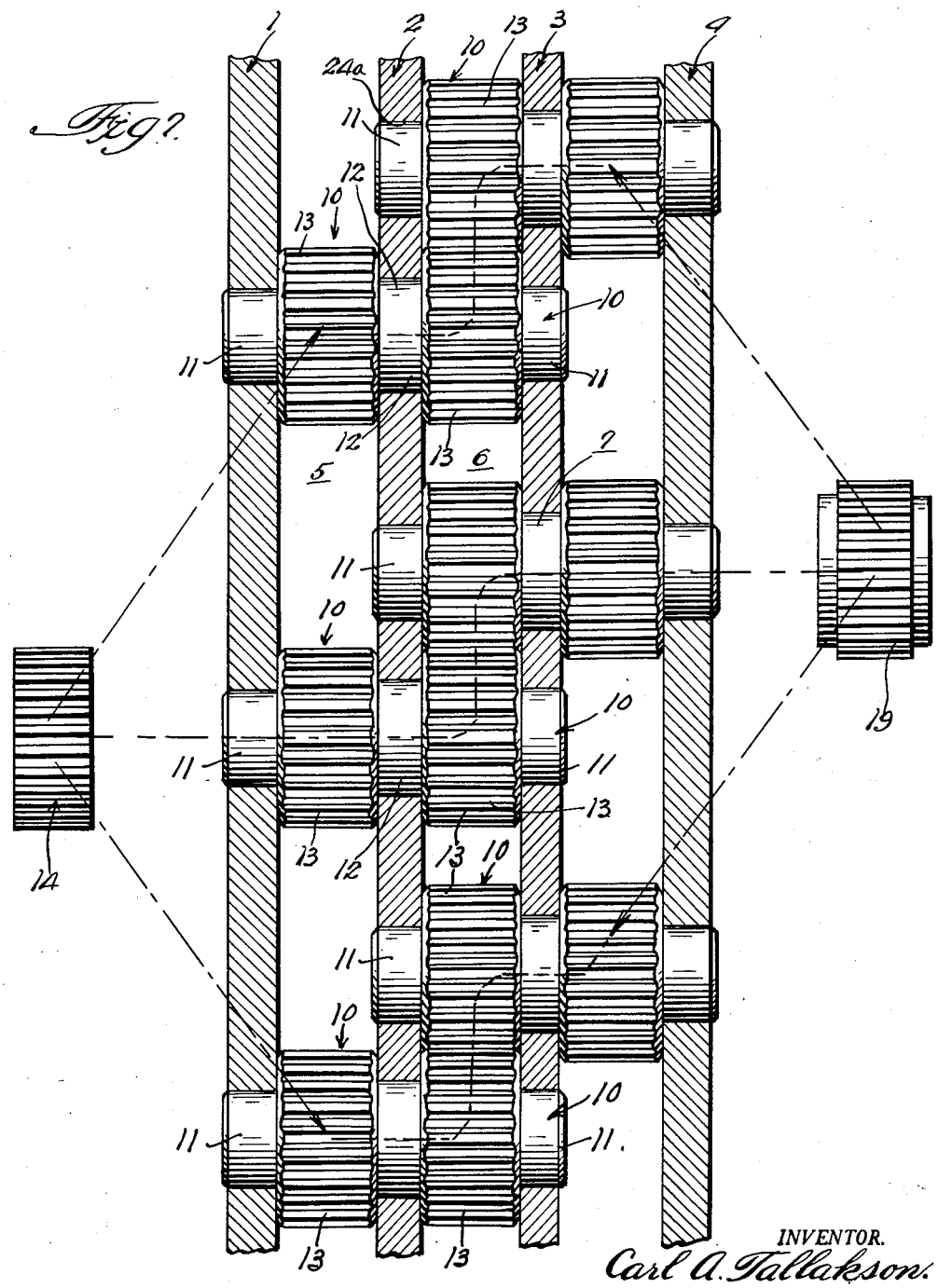

United States Patent Office 2,786,366
Patented Mar. 26, 1957

2,786,366

VARIABLE TORQUE DISTRIBUTING DIFFERENTIAL GEARING

Carl A. Tallakson, Durand, Ill., assignor to Dualoc Engineering Co., Rockford, Ill., a corporation of Illinois Application February 14, 1956, Serial No. 565,390

8 Claims. (Cl. 74—711)

This invention relates to a variable torque distributing differential gearing of a type similar to that disclosed in the United States Patent No. 2,536,392, issued on January 2, 1951, to R. R. Randell.

The importance of proper torque distribution to the drive wheels in the automotive field has long been recognized. Various types of differential gearing have heretofore been proposed to vary the torque distribution or create a torque differential of high magnitude to the drive wheels, when one of the wheels encounters relatively poor traction. Such proposed gearings, however, are beset with one or more shortcomings; for example, complexity and costliness of construction, lack of compactness, when assembled, thereby necessitating major changes in the chassis design of the vehicle or poor performance under a wide range of operating conditions of the vehicle. In addition, assembling of various prior units oftentimes involves extreme care and accuracy in effecting proper adjustment and alignment of various cooperating or intermeshing parts thereof.

Thus, it is one of the objects of the present invention to provide a differential gearing construction which effectively overcomes the aforementioned shortcomings associated with prior devices of this type.

It is a further object of this invention to provide a gearing construction which is capable of responding quickly, effectively, and automatically to changing operating conditions.

Further and additional objects will appear from the description, accompanying drawings, and appended claims.

In accordance with one embodiment of this invention, a differential gearing is provided, comprising a gear carrier power driven by the propeller shaft of the vehicle, a sun gear coaxial with the gear carrier and splined to the axis of one of the vehicle drive wheels, a cylindrically or sleeve-shaped clamp externally threaded and splined to the axle of the other vehicle drive wheel and coaxial with said sun gear, a nut gear threadedly mounted on the externally threaded portion of said clamp, and a plurality of meshing orbital gears, certain of which are in meshing relation with said sun gear and others of which are in meshing relation with said nut gear. The orbital gears are held in symmetrical relation about the axis of the gear carrier by a plurality of axially spaced plates carried by said carrier. The clamp and nut gears are adapted to cooperate with one another to effect clamping of one of said plates, whereby the whole differential gearing rotates as a unit, or the nut gear abuts a second plate and transmits substantially all of the developed torque to only the drive wheels splined to the sun gear.

For a more complete understanding of this invention, reference should be made to the drawings, wherein Fig. 1 is a fragmentary perspective view of the interior of the improved torque distributing differential gearing, showing the relative position of four spaced plates, comprising the gear carrier, and various intermeshing gears lying therebetween and with the assembly bolts for the carrier partially removed;

Fig. 2 is a perspective view similar to Fig. 1 but showing one of the carrier end plates removed and exposing one set of orbital gears in meshing relation with the sun gear which is splined to the axle for one of the drive wheels;

Fig. 3 is a perspective view showing one carrier end plate and the adjacent intermediate plate and certain gears, associated therewith, removed;

Fig. 4 is a perspective view showing the concealed face of the driven end plate of the carrier;

Fig. 5 is an enlarged fragmentary left end view of the improved differential gearing, as seen in Fig. 1;

Fig. 7 is an axial section view taken along line 7—7 of Fig. 5, which passes through the axes of the orbital gears, and, in addition, the nut gear and axle gear are shown diagrammatically disposed on opposite sides of the section view with the paths of driving force shown in dotted lines emanating from the axle gear, through the orbital gears to the nut gear;

Fig. 8 is a transverse section view taken along line 8—8 of Fig. 6;

Fig. 12 is a perspective view of a plate spacer element;

Fig. 13 is an enlarged perspective view of the concealed face of the end plate of the carrier shown in Fig. 1, and Fig. 14 is a perspective view of one of the intermediate plates of the carrier.

Figure 6:
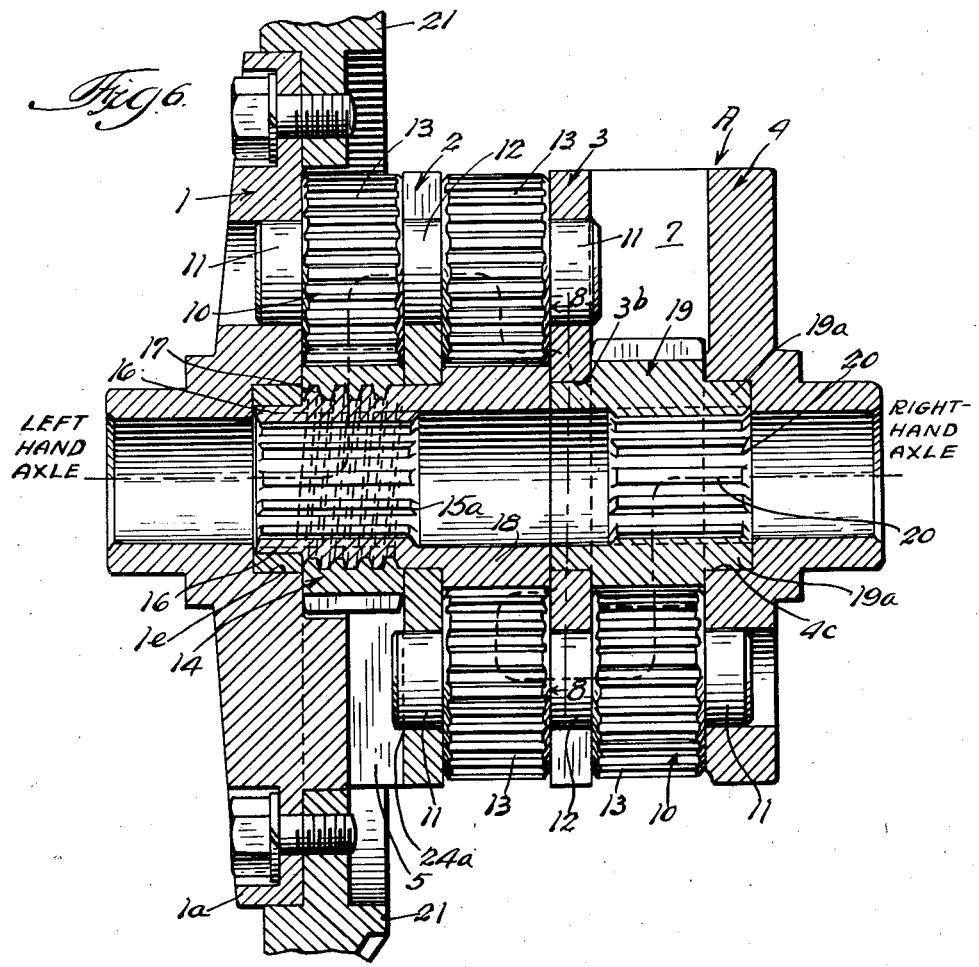
Fig. 6 is an axial section view taken along line 6—6 of Fig. 5.

Referring now to the drawings and more particularly to Figs. 1–4, an improved differential gearing is shown, comprising a gear carrier A which includes four coaxially arranged, relatively spaced plates 1, 2, 3, and 4 which are interconnected to one another by a plurality of anchoring or assembly nut and bolt units 8 which extend through suitable annular spaced openings 9 formed in each plate. Plates 1 and 4 are end plates, and plates 2 and 3 are intermediate plates of the carrier A. The spaces 5, 6, and 7 formed between plates 1–4 are adapted to accommodate various gears, to be hereinafter discussed, which form part of the improved differential gearing.

End plate 1, seen more clearly in Fig. 4, is provided with an annular, outwardly extending flange 1a to which is affixed a bevel ring gear 21. Bevel gear 21 is externally driven by the propeller or drive shaft of the vehicle in which the differential gearing is installed. The entire gearing is adapted to be enclosed within a housing, not shown.

Protruding from the inner face of end plate 1, or the surface thereof adjacent plate 2, are a plurality of symmetrically arranged bosses 1b of similar configuration, each having an arcuate flange 1c formed on the outer end thereof which is adapted, when said gearing is assembled, to be disposed within a recess 2a formed in the periphery of plate 2, see Fig. 14, and retain plates 1 and 2 in properly spaced coaxial relation. The bosses 1b are symmetrically arranged about a relieved central surface area 1d, in which is formed a central bearing opening 1e, through which extends the axle of a drive wheel, not shown, and a clamp 15 to which the end of the axle is splined. Extending radially from the relieved central surface area 1d and disposed in symmetrical relation therewith, are outer relieved portions 1f, each of which is provided with a bearing opening 1g for accommodating an orbital gear 10, to be more fully described hereinafter.

Between plates 2 and 3 are disposed a plurality of substantially wedge-shaped spacer pieces 22, see Fig. 12, which are adapted to maintain plates 2 and 3 in proper spaced relation. Each piece 22 has the opposite end faces thereof provided with arcuate-shaped flanges 22a which, in turn, are disposed within the recesses 2a and 3a formed in the peripheries of plates 2 and 3, respectively. The latter plates 2 and 3 are of like configuration and, therefore, only one of such plates will be described more fully hereinafter. An elongated opening 22b is formed in each piece 22 which interconnects the flanged opposite end faces of the piece and is adapted to be aligned with the anchoring bolt holes 9 formed in the plates 1–4.

End plate 4, see Fig. 13, is likewise provided with symmetrically arranged spacer bosses 4a, which function in a manner similar to bosses 1b of end plate 1 and retain plates 3 and 4 in proper spaced relation. Bosses 4a are of greater axial length than bosses 1a because the surface of the end plate 4, from which they extend, is provided with a plateau portion 4b. The plateau portion 4b has a countersunk center bearing opening 4c which is adapted to accommodate the axle of the other drive wheel, not shown, and one end of an axle gear 19 to be described more fully hereinafter. Plateau portion 4b is likewise provided with radially extending sections 4d which, in turn, are provided with openings 4e for accommodating one end of orbital gears 10, heretofore mentioned.

Figure 11:
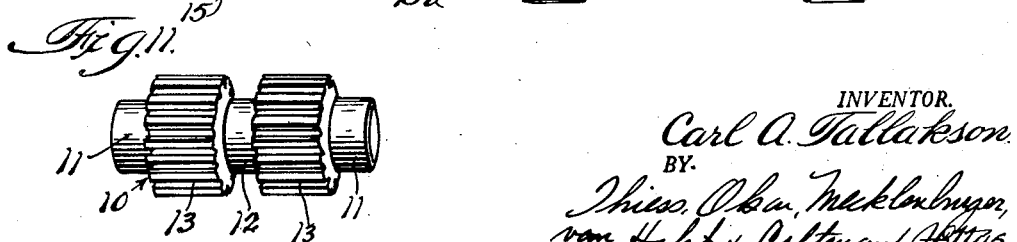
Fig. 11 is a perspective view of one of the orbit gears.

Disposed within the spaces 5, 6, and 7 formed between plates 1–4 are a plurality of duplex orbital gears 10, one of which is shown more clearly in Fig. 11. Each gear is of like construction and includes end journals 11, a center journal 12, and two pinion portions 13 disposed on opposite sides of journal 12. The pinions 13 of each orbital gear 10 are of like configuration and are adapted, when the gears 10 and plates 1–4 are assembled, to be separated by either plate 2 or 3. Each plate 2 or 3 is provided with a plurality of open-end, radially extending pockets 24 formed in the periphery thereof. The width of each pocket 24 is slightly larger than the diameter of journal 12 of orbital gear 10, thereby permitting the latter to be readily assembled with respect to plates 2 and 3. Each plate 2 and 3, in this instance, is provided with three pockets 24 for accommodating three orbital gears 10. Intermediate adjacent pockets of plate 2 or 3 is a pair of openings 9 and 24a. Opening 9, heretofore mentioned, is adapted to accommodate the anchoring bolt 8. Opening 24a, on the other hand, accommodates the end journal 11 of the gear 10, disposed in the pocket 24 of the other plate. Thus, when plates 2 and 3 are assembled, the openings 24a of plate 2 are in registration with the pockets 24 of plate 3 and vice versa. The thickness of each plate 2 and 3 is slightly less than the axial dimension of each journal 12 of the gears 10.

Figures 9, 10:
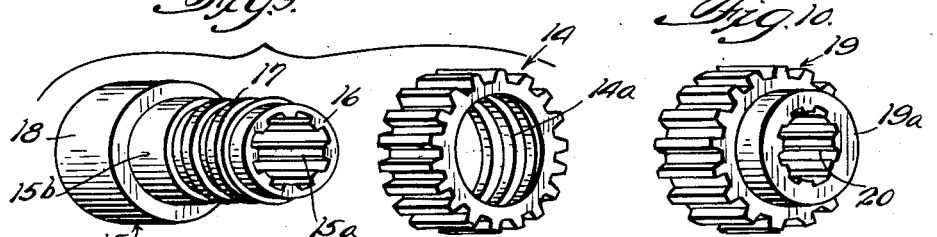
Fig. 9 is a perspective disassembled view of the nut gear and clamp, the latter showing the splined center bore thereof for accommodating the axle of one of the drive wheels.
Fig. 10 is a perspective view of the axle gear showing the splined center bore thereof.

The pinions 13 of the trio of gears 10 disposed within space 5 are in meshing relation with a nut gear 14, which is a spur type gear with the center bore 14a thereof internally threaded. The gear 14 is threadably mounted on a cylindrically shaped or sleeve-like clamp 15, see Fig. 9, and is disposed within gear space 5. The axial length of nut gear 14 is less than the distance between relieved center portion 1d of plate 1 and the adjacent surface of plate 2. Thus, under certain operating conditions the gear 14 will move axially of threaded shank portion 17 of clamp 15 and cause plate 2 to be gripped between gear 14 and a collar 18 formed on clamp 15, or move in the opposite direction and abut plate 1.

The clamp 15 has the interior 15a thereof splined for accommodating the end of the left-hand axle, not shown, of one of the drive wheels of the vehicle. The outer periphery of one end 16 of the clamp is slightly reduced in cross-section and forms a journal which is disposed within the bearing opening 1e of end plate 1. A portion 17 of the shank of clamp 15 is externally threaded and is adapted to mesh with the internal threads 14a of nut gear 14. The opposite end of clamp 15 is provided with an annular collar 18 which is adapted to be disposed within gear space 6. As seen in Fig. 8, the outside diameter of collar 18 is such that the collar is out of contact with the pinions 13 of the orbital gears 10 disposed within such space 6. The portion 15b of the shank of clamp 15, intermediate externally threaded portion 17 and collar 18, is a journal and is adapted to be supported by a center opening 2b formed in plate 2, see Fig. 14.

The openings 1g formed in the radially extending relieved portions 1f of end plate 1, see Fig. 4, are adapted to accommodate one of the journal ends 11 of the gears 10, in meshing relation with nut gear 4.

The gear pinions 13 which are disposed within gear space 6 are arranged in such a way that three sets of intermeshing pairs are formed, so that power is transmitted directly from end plate 1, through the duplex gears 10 carried thereby, through the duplex gears 10 carried by end plate 4 and then to the axle sun gear 19 one end 19a of which is disposed within the center opening 3b, see Fig. 6, of plates 3. The other end journal 19a is disposed within the bearing opening 4c of end plate 4. The interior 20 of axle gear 19 is splined and is adapted to accommodate the end of the right-hand axle, not shown, for the other drive wheel.

The path of power flow through the differential gearing is shown by broken lines in Figs. 6 and 7. For the purposes of facilitating understanding of the operation of the improved differential gearing under various operating conditions of the vehicle, the left-hand and right-hand axles which cooperate with the end plates 1 and 4, respectively, are indicated in Fig. 6. Three of the various conditions under which the improved differential gearing might operate are:

Condition 1.—Rectilinear forward travel of the vehicle with equal traction for both drive wheels.

Condition 2.—Rectilinear forward travel of the vehicle with good traction on left-hand drive wheel, and poor traction on the right-hand drive wheel, Condition 3.—Curvilinear forward travel of the vehicle with equal traction for both drive wheels and left-hand wheel being precessed with respect to the right-hand wheel.

While numerous other operating conditions might occur, other than those aforenoted, it is believed that the three conditions are illustrative of the operation of the improved differential gearing.

*Discussion of Condition 1*

It will be assumed for the purposes of this discussion that the vehicle will start from a standing position. Upon starting from the standing position, the end plate 1 will rotate in one direction (clockwise, see Fig. 5) by reason of the ring gear 21, whereupon the nut gear 14 will be rotated in a counterclockwise direction by the pinions 13 of the orbital gears 10 carried by plate 1. The nut gear 14, in turn, will turn relative to clamp 15, by reason of the fact that the left-hand wheel will be at a standstill until the nut gear 14 abuts plate 2 and effectively grips the latter between gear 14 and the collar 18 formed on the clamp 15. When this latter conditions occurs, the nut gear 14, clamp 15, orbital gears 10 and plates 1–4 are locked together and result in all rotating as a unit in a clockwise direction. Simultaneously with the locking of nut gear 14, clamp 15, orbital gears 10, and plates 1–4, the axle gear 19 is also rotated in the same direction by the pinions 13 of the orbital gears 10 carried by plate 4. Thus, under Condition 1, equal torque will be exerted on each drive wheel.

*Discussion of Condition 2*

The relative movement of nut gear 14 with respect to clamp 15 to effect gripping of plate 2 between the gear and collar 18 of the clamp is substantially the same as that described under the discussion of Condition 1. Once the gripping action occurs the entire differential gearing will rotate as a unit; however, more torque will be transmitted through the left-hand drive wheel than through the right-hand drive wheel, because of the greater resistance encountered by the left-hand wheel.

*Discussion of Condition 3*

It will be assumed that prior to the curvilinear forward travel of the vehicle, the latter was traveling rectilinearly in a forward direction and that nut gear 14 and collar 18 of clamp 15 were in gripping relation with plate 2. Precession of the left-hand wheel might occur upon the vehicle being steered to the right. When this latter condition occurs, a resistive force in a counter-clockwise direction is imposed on axle gear 19 which, in turn, is transmitted back through the orbital gears 10, causing the nut gear 14 to release its grip upon plate 2. The nut gear 14 will continue to move relative to the clamp 15 until it abuts plate 1, at which time the power is transmitted to the right-hand wheel while the left-hand wheel is free to assume its necessary speed. When, however, the vehicle returns to its rectilinear direction of travel, precession of the left-hand drive wheel will stop, and the nut gear will again move relative to the clamp until it is again in gripping relation with plate 2 and equal torque is transmitted to each wheel.

Thus, with the improved differential gearing greater torque will be transmitted to the drive wheel possessed of the greatest traction, thereby minimizing the loss of power and overcoming a problem of considerable magnitude heretofore experienced by prior differential gearing. In addition, the improved gearing is of a greatly simplified construction, thereby facilitating assembly and adjustment of the various parts of such a differential gearing.

While a particular embodiment of this invention is shown above, it will be understood, of course, that the invention is not to be limited thereto, since many modifications may be made, and it is contemplated, therefore, by the appended claims, to cover any such modifications as fall within the true spirit and scope of the invention.

I claim:

1. A variable torque distributing differential gearing for a vehicle, comprising a rotatable gear carrier, two orbital gears rotatably mounted on said carrier and each provided with two axially spaced, toothed faces, the axes of said orbital gears being parallel to the axis of said carrier, one toothed face of each orbital gear being in meshing relation with one another, and two relatively spaced gears disposed coaxially with respect to the rotary axis of said gear carrier; one of said coaxial gears being axially adjustable relative to said carrier and in meshing relation with the other toothed face of one of the orbital gears, and the other of said coaxial gears being in a relatively fixed axial position with respect to said carrier and in meshing relation with the other toothed face of the second orbital gear.

2. A variable torque distributing differential gearing for a vehicle, comprising a rotatable gear carrier provided with a plurality of interconnected, axially spaced, parallel plates, two orbital gears rotatably mounted on and extending intermediate said plates and each gear being provided with two axially spaced, toothed faces, the axes of said orbital gears being parallel to the axis of said carrier and spaced equally therefrom, one toothed face of each orbital gear being in meshing relation with one another in the space formed intermediate a selected pair of said plates, and two relatively spaced gears disposed coaxially with respect to the rotary axis of said gear carrier; one of said coaxial gears being axially adjustable relative to said carrier and disposed to one side of the space, in which the toothed faces of said orbital gears are meshing, and in meshing relation with the other toothed face of one of the orbital gears, and the other coaxial gear being in a relatively fixed axial position with respect to said carrier and disposed on the opposite side of said plate space and in meshing relation with the other toothed face of the second orbital gear.

3. A variable torque distributing differential gearing for a vehicle, comprising a rotatable gear carrier, two orbital gears rotatably mounted on said carrier and each provided with two axially spaced, toothed faces, the axes of said orbital gears being parallel to the axis of said carrier, one toothed face of each orbital gear being in meshing relation with one another, two relatively spaced gears disposed coaxially with respect to the rotary axis of said gear carrier; one of said coaxial gears being in a relatively fixed axial position with respect to said carrier and drivingly connected to a wheel axle of the vehicle and in meshing relation with the other toothed face of one of the orbital gears, and the second coaxial gear being axially adjustable with respect to said carrier and in meshing relation with the other toothed face of the second orbital gear, and means carried by said carrier axially of said one coaxial gear and drivingly connected to a second wheel axle of the vehicle and extending axially through and engaged by said axially adjustable gear; torque being distributed to the wheel axles of the vehicle only when said second coaxial gear is in a predetermined position of axial adjustment with respect to said means and said carrier.

4. A variable torque distributing differential gearing for a vehicle, comprising a rotatable gear carrier provided with a plurality of interconnected, axially spaced, parallel plates, two orbital gears rotatably mounted on and extending intermediate said plates and each gear being provided with two axially spaced, toothed faces, the axes of said orbital gears being parallel to the axis of said carrier and spaced equally therefrom, one toothed face of each orbital gear being in meshing relation with one another in the space formed intermediate a selected pair of said plates, two relatively spaced gears disposed coaxially with respect to said gear carrier and on opposite sides of the plate space in which the toothed faces of said orbital gears are meshing; one of said coaxial gears being connected to a wheel axle of the vehicle and in meshing relation with the other toothed face of one of said orbital gears, and the second coaxial gear being axially adjustable and in meshing relation with the other toothed face of the second orbital gear, and means carried by said carrier and coaxial therewith and connected to a second wheel axle of the vehicle, said means extending through said axially adjustable gear and cooperating therewith, when the latter is in a predetermined position of axial adjustment, to effect clamping of one plate of said pair of plates and unitary rotation of said differential gearing and the wheel axles of the vehicle.

5. The differential gearing recited in claim 4 wherein the axially adjustable gear is threadably mounted on the periphery of said means carried by the carrier.

6. A variable torque distributing differential gearing for a vehicle, comprising a rotatable gear carrier provided with a plurality of interconnected axially spaced, parallel plates, two orbital gears rotatably mounted on and extending intermediate said plates, the axes of said orbital gears being parallel to the axis of said carrier, one portion of each orbital gear being in meshing relation with respect to one another in a space intermediate a predetermined pair of carrier plates, two relatively spaced gears disposed coaxially with respect to said gear carrier and on opposite sides of said plate space; one of said coaxial gears being connected to a wheel axle of the vehicle and in meshing relation with a second portion of one of said orbital gears, and the second coaxial gear being in meshing relation with a second portion of the other orbital gear, and a sleeve-like clamp on which said second coaxial gear is threadably mounted, said clamp being connected to a second wheel axle of the vehicle and extending axially through said second coaxial gear and terminating within said plate space, the terminating end of said clamp being provided with an enlarged collar which, when said second coaxial gear is moved relative to said clamp in a direction toward one plate of said predetermined pair of carrier plates, cooperates with said second coaxial gear to effect gripping of said one plate between said second coaxial gear and said enlarged clamp collar.

7. The differential gearing recited in claim 3 wherein said means comprises a sleeve-like clamp, including an enlarged collar adjacent one end thereof, and an externally threaded shank portion axially spaced from said collar and on which said second coaxial gear is threadably mounted; said collar cooperating with said second coaxial gear, when the latter is in one position of threadable adjustment, to effect gripping of a portion of said gear carrier, whereby said gear carrier, orbital gears, coaxial gears, and said clamp rotate as a unit.

8. The differential gearing recited in claim 6 wherein said sleeve-like clamp is provided with interior splines for cooperative engagement by the wheel axle of the vehicle.

References Cited in the file of this patent

UNITED STATES PATENTS

| | | |
|---|---|---|
| 1,556,101 | Goodhart | Oct. 6, 1925 |
| 1,938,649 | Welsh | Dec. 12, 1933 |
| 2,269,734 | Powell | Jan. 13, 1942 |
| 2,481,873 | Randall | Sept. 13, 1949 |
| 2,651,215 | Schoenrock | Sept. 8, 1953 |

FOREIGN PATENTS

| | | |
|---|---|---|
| 854,155 | Germany | Oct. 30, 1952 |